(12) United States Patent
Loveday et al.

(10) Patent No.: US 9,179,643 B2
(45) Date of Patent: Nov. 10, 2015

(54) SELF-CLEANING LITTER BOX

(75) Inventors: Myra Loveday, Knoxville, TN (US);
Xiao JiangLin, Shenzhen (CN); Shang Lianhui, Dongguan (CN); Yu Ziqian, Shenzhen (CN)

(73) Assignee: RADIO SYSTEMS CORPORATION, Knoxvill, TN (US)

( * ) Notice: Subject to any disclaimer, the term of this patent is extended or adjusted under 35 U.S.C. 154(b) by 204 days.

(21) Appl. No.: 13/608,650

(22) Filed: Sep. 10, 2012

(65) Prior Publication Data

US 2014/0069343 A1 Mar. 13, 2014

(51) Int. Cl.
*A01K 1/01* (2006.01)
*A01K 29/00* (2006.01)

(52) U.S. Cl.
CPC .............. *A01K 1/011* (2013.01); *A01K 1/0114* (2013.01); *A01K 1/0132* (2013.01)

(58) Field of Classification Search
CPC .... A01K 1/0132; A01K 1/0114; A01K 1/011
USPC ......................................... 119/165, 166, 168
See application file for complete search history.

(56) References Cited

U.S. PATENT DOCUMENTS

| 5,544,620 | A  | 8/1996  | Sarkissian      |
|-----------|----|---------|-----------------|
| 6,763,782 | B1 | 7/2004  | Kordelin        |
| 6,951,190 | B2 | 10/2005 | Northrop et al. |
| 8,156,895 | B2 | 4/2012  | Caputa et al.   |
| 8,166,919 | B2 | 5/2012  | Cook et al.     |

OTHER PUBLICATIONS

International Search Report and Written Opinion for PCT/US2013/058769 mailed Jan. 3, 2014.

*Primary Examiner* — Son T Nguyen
(74) *Attorney, Agent, or Firm* — Steven F. Owens; Merchant & Gould

(57) ABSTRACT

A self-cleaning litter box. The self-cleaning litter box includes a rake drive housing that is securable to and removable from a litter tray. The rake drive housing contains the rake drive control system. The rake drive control system automatically cleans the litter tray after each use and/or on a periodic basis by combing the litter with a sweeping rake. The sweeping rake is paired with a spade that loosens waste products that is stuck to the litter tray. At the disposal end of the self-cleaning litter box, a disposal rake cooperatively rotates with the sweeping rake to transfer waste products into a waste receptacle.

18 Claims, 6 Drawing Sheets

SELF-CLEANING LITTER BOX

BACKGROUND

It is generally recognized that cats will not use a dirty litter box. Manual litter boxes require someone to regularly monitor their usage and periodically remove waste from the litter. Regularly removing waste from the litter box also helps to minimize unpleasant odors. Automated or self-cleaning litter boxes attempt to address both of these issues by collecting the waste after each use or, in some cases, on a schedule. Various designs of self-cleaning litter boxes are known in the art. For the most part, existing self-cleaning litter box designs adequately remove waste from the unused litter; however, each existing self-cleaning litter box design generally has one or more undesirable qualities that undermine its effectiveness.

BRIEF SUMMARY

The following summary describes features of various embodiments of the invention. It is not intended to limit the description of the invention in any way. The sweeping rake is paired with a spade that loosens waste products that is stuck to the litter tray. At the disposal end of the self-cleaning litter box, a disposal rake cooperatively rotates with the sweeping rake to transfer waste products into a waste receptacle.

The self-cleaning litter box includes a litter tray, a waste storage area, a sweeping rake, a spade, a disposal rake, and a rake drive housing. The litter tray serves as a base and holds the litter for use by the feline. The waste storage area holds waste products removed from the litter tray. The rake drive housing contains all of the components of the rake control drive system. The rake drive housing is selectively secured to and unsecured from the litter tray by one or more mechanical fasteners. In various embodiments, the waste storage area is a part of the litter tray that is separate from and holds waste removed from the litter area. Some embodiments of the waste storage area include an independent waste receptacle that is removable from the self-cleaning litter box to allow disposal of the contents and/or cleaning of the waste receptacle. Various embodiments of the waste receptacle include a waste receptacle cover (i.e., lid).

The sweeping rake and the disposal rake each include a bow and a multiple tines extending from the bow. The bow provides support and serves as a rotation axis for the sweeping rake. Each end of the bow includes a fastener that is configured to cooperate with a corresponding fastener on the rake carriage. The fasteners allow the sweeping rake and the disposal rake to be selectively attached to and detached from the rake drive system. In various embodiments, at least one rake gear is located at one end of the bow to allow the sweeping rake and the disposal rake to rotate.

The sweeping rake is generally paired with a spade. The spade includes a floor blade that runs parallel to the bow. A side member extends upwardly from each end of the floor blade. The side members are generally angled at the same angle as the side walls of the litter tray. The floor blade is bar used to dislodge waste products from the floor of the litter area. The side member includes a side blade, a support, or a combination of the side blade and support. The side blade is structurally similar to the floor blade and is used to dislodge waste products from the side walls of the litter tray. The spade is sized and positioned to travel close to the floor and side walls of the litter tray leaving a small amount of clearance so the spade does not drag against the litter tray and add unnecessary load to the rake drive. The amount of clearance is selected so that most waste products stuck to the floor will have a thickness that exceeds the clearance height.

The rake drive control system automatically cleans the litter tray after each use and/or on a periodic basis by combing the litter with a sweeping rake. The rake drive control system includes a controller, a rake drive, the presence detector, and the control panel. The controller receives inputs and feedback and controls the operation of the operative components. The presence detector generally detects the presence of an object (i.e., an animal or cat) in the self-cleaning litter box or the depositing of waste in the self-cleaning litter box and produces a presence signal. The presence detector is in communication with the controller. When the output of the presence detector indicates that an object (i.e., an animal) has entered the litter tray, the controller initiates the cleaning cycle. The cleaning cycle begins with a delay period measured from the time that the animal enters the self-cleaning litter box. If the output of the presence detector indicates the litter tray is empty at the end of the delay period, the controller produces a rake drive activation signal to activate the rake drive.

The rake drive includes an actuator and the rake carriage. The actuator includes a motor and a linkage, transmission, and/or other power transfer device that operatively connects the motor to the rake carriage, the sweeping rake, and/or the disposal rake. The rake carriage provides a point of attachment and carrier for the sweeping rake. The actuator moves the rake carriage in a linear fashion from the home position drive toward the disposal position.

During operation, the linear motion of the rake carriage carries the tines of the sweeping rake through the litter. As the sweeping rake travels from the home position to the disposal position, the tines comb through the litter in the litter tray and push waste products toward the waste storage area. At the disposal position, the transmission disengages from the rake carriage and engages the sweeping rake and/or the disposal rake. When the transmission and the rake rotation gear are operatively engaged, the sweeping rake and/or the disposal rake rotate to move the waste to the waste storage area. The sweeping rake rotates in the direction of the disposal rake and vice versa. The tines of the disposal rake are laterally offset from the tines of the sweeping rake tines such that the tines of each rake pass through the spaces between the tines in the other rake. The opposite rotations allow the sweeping rake and the disposal rake to cooperatively lift the waste products out of the unclumped litter.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A self-cleaning litter box is described herein and illustrated in the accompanying figures. The self-cleaning litter box includes a rake drive housing that is securable to and removable from a litter tray 102. The rake drive housing contains all of the components of the rake control drive system. The sweeping rake is paired with a spade 110 that loosens waste products that is stuck to the litter tray 102. At the disposal end of the self-cleaning litter box, a disposal rake cooperatively rotates with the sweeping rake to transfer waste products into a waste receptacle.

Figure 1:
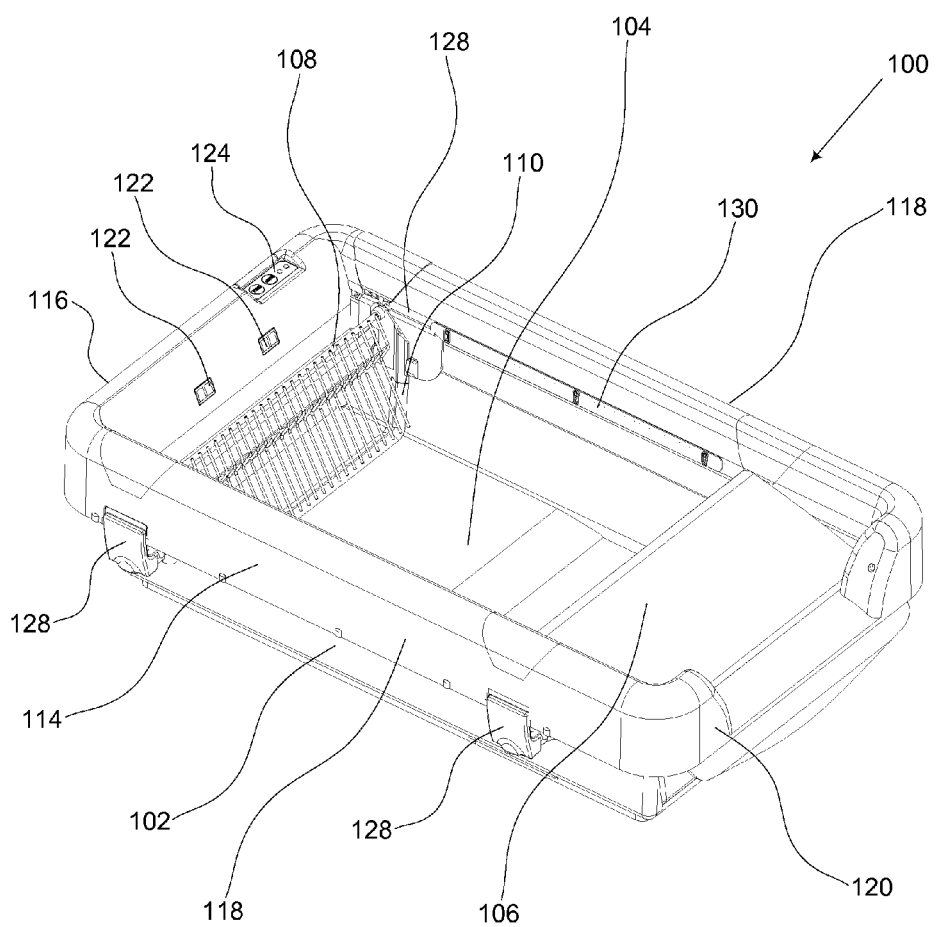
FIG. 1 is a perspective view of one embodiment of the self-cleaning litter box.

FIG. 1 is a perspective view of one embodiment of the self-cleaning litter box 100 that automatically collects and stores waste products for disposal. Waste products include solid waste and, when used with clumping litter, any masses of litter (i.e., clumps) created by the addition of liquid waste. The self-cleaning litter box 100 includes a litter tray 102, a litter area 104, a waste storage area 106, a sweeping rake 108, a spade 110, a disposal rake 112 (not visible in FIG. 1), and a rake drive housing 114. The litter tray 102 serves as a base and holds the litter for use by the animal. The waste storage area 106 holds the waste products removed from the litter tray 102. The sweeping rake 108 between a home position proximate to the first end of the self-cleaning litter box 100 and a disposal position proximate to the waste storage area 106 to comb through the litter and collect any waste products. The spade 110 dislodges waste products from the floor of the litter tray 102. The disposal rake 112 cooperates with the sweeping rake 108 to move the waste products to the waste storage area 106.

The rake drive housing 114 includes at least three rails including a first end rail 116 and two parallel side rails 118 that are substantially perpendicular to the first end rail 118 and extend away from the first end rail 116 in the same direction. In some embodiments, the rake drive housing 114 includes an optional second end rail 120. The rake drive housing 114 carries the operative mechanical and electronic components of the self-cleaning litter box 100 within and/or on the rails 116, 118, 120. Externally visible on the rake drive housing 114 are a presence detector 122 and a control panel 124. The presence detector 122 generally detects the presence of an object (i.e., an animal or cat) in the self-cleaning litter box 100 or the depositing of waste in the self-cleaning litter box 100. The control panel 124 provides a user interface for controlling the operation of the self-cleaning litter box 100. In various embodiments, the self-cleaning litter box 100 includes one or more presence detectors 122 and/or control panels 124. In some embodiments, each presence detector 122, each control panel 124, and each separate components thereof (e.g., an emitter and a separate detector of an active optical sensor), if any, are located on the same rail. In other embodiments, each presence detector 122, each control panel 124, and any separate components are located on different rails 116, 118, 120 in any combination.

Figure 2:
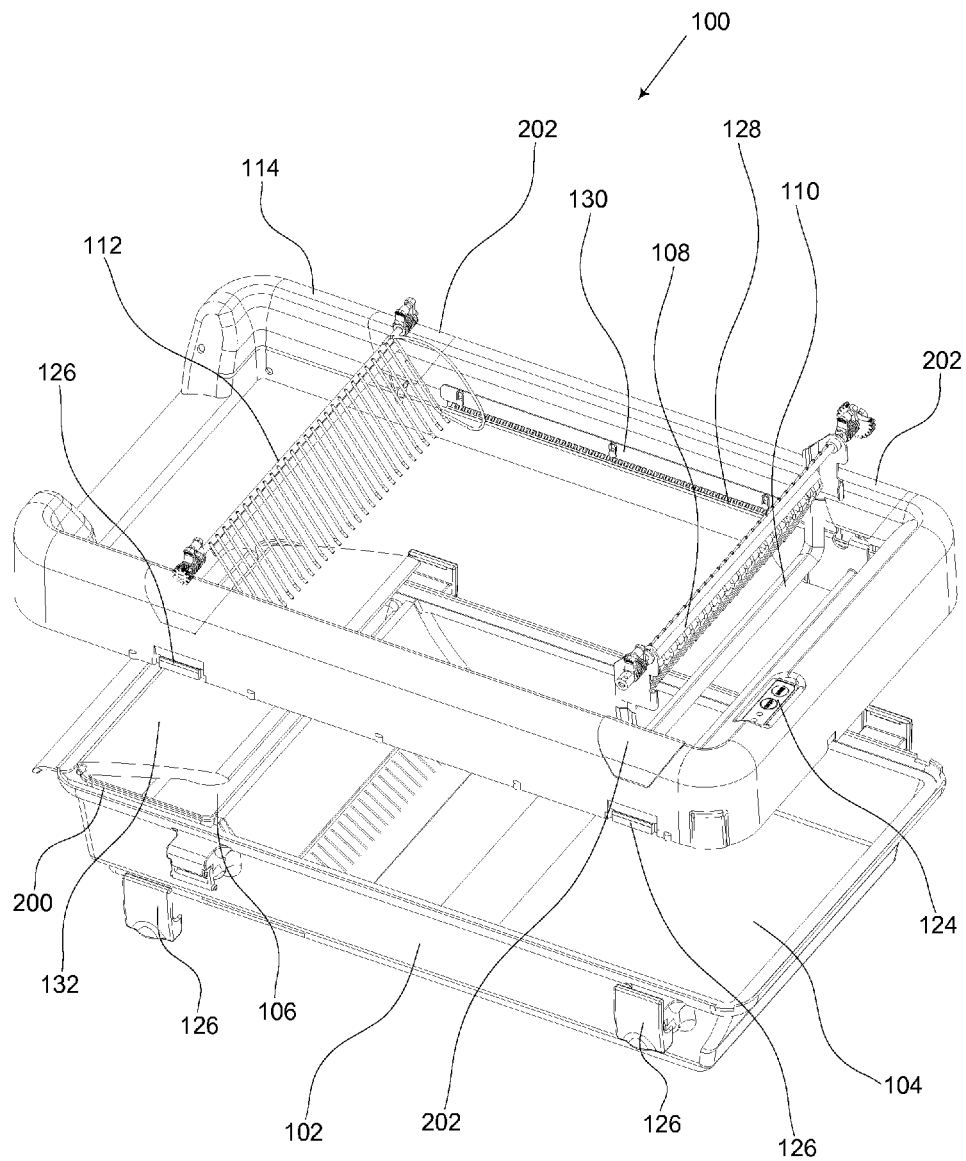
FIG. 2 is an exploded perspective view of one embodiment of the self-cleaning litter box.

The rake drive housing 114 is selectively secured to and unsecured from the litter tray 102 by one or more mechanical fasteners 126. Generally, each mechanical fastener includes a first part associated with the rake drive housing 114 and a corresponding second part associated with the litter tray 102. Examples of suitable mechanical fasteners include, but are not limited to, clips, latches, and flanges. In various embodiments, the mechanical fasteners do not require tools for fastening. When the mechanical fasteners 126 are fastened, the rake drive housing 114 is securely attached to the litter tray 102, as illustrated in FIG. 1. In the fastened condition, the rake drive housing 114 and the litter tray 102 are moveable as a single unit. When the mechanical fasteners 126 are unfastened, the rake drive housing 114 is separable from the litter tray 102, as illustrated in FIG. 2. The various features of the self-cleaning litter box 100 are further illustrated in FIGS. 5-8.

The inner wall of each side rail defines a longitudinal opening 128 (i.e., a slot). The slot allows the external access to the operative components of the rake drive housed inside the rake drive housing. The slot is covered by a barrier 130 that does not restrict movement of the rake carriage or any component carried by the rake carriage, including the sweeping rake and the spade 110 but limits or eliminates the ability of contaminants including fluids and debris (e.g., the waste products, litter, litter dust, and cleaners) from entering the rake drive housing and contaminating or damaging the operative components contained in the rake drive housing. Examples of suitable barriers include, but are not limited, a pile curtain, a movable barrier, a telescoping barrier, and a solid, flexible curtain fabricated from a textile, fabric, a compressible foam, or elastomer. In the illustrated embodiment, the barrier is a slide plate that moves with the sweeping rake 108.

FIG. 2 is an exploded front perspective view of one embodiment of the self-cleaning litter box 100. As clearly seen in FIG. 2, the litter tray 102 includes a floor and plurality of walls extending upwardly from the floor. The walls of the litter tray 102 define a litter area intended to hold the litter for use by a cat. Generally, the walls of the litter tray 102 are substantially vertical. In some embodiments, the floor of the litter area is substantially flat. In other embodiments, the floor of the litter area proximate to the waste end has one or more steps with vertical, curved, or inclined surfaces joining the steps.

In various embodiments, the waste storage area 106 is a part of the litter tray 102 that is separate from and holds waste removed from the litter area. In some embodiments of the waste storage area 106 include an independent waste receptacle 200. Generally, the secondary compartment and/or the waste receptacle 200 are upwardly opening containers with an open top. The waste receptacle 200 is removable from the self-cleaning litter box 100 to allow disposal of the contents and/or cleaning of the waste receptacle 200. In the illustrated embodiment, the waste receptacle 200 is received in and lines the secondary compartment of the litter tray 102. In alternate embodiments where the litter tray 102 does not include a secondary compartment, the waste receptacle 200 attaches to the end of the litter tray 102 or to the rake drive housing 114.

The rake drive housing 114 carries the operative mechanical and electronic components of the self-cleaning litter box 100. During normal usage, the sweeping rake 108, the spade 110, and the disposal rake 112 are attached to the operative components carried by the rake drive housing 114 and the rake drive housing 114 is attached to the litter tray 102. In the illustrated embodiment, the sweeping rake 108, the spade 110, and the disposal rake 112 are shown detached from the rake drive housing 114. Access to the sweeping rake 108 and the disposal rake 112 is provided through access ports 202 in the rake drive housing 114. The access ports 202 are normally covered by covers to minimize the likelihood that fluids, solid waste, litter, litter dust, and other contaminants associated with a litter box can enter the rake drive housing 114 and contaminate the operative components.

The ability to separate the waste engaging components (i.e., the litter tray 102, the sweeping rake 108, the spade 110, and the disposal rake 112) from the operative components carried by the rake drive housing 114 allows the waste engaging components may be thoroughly cleaned without risk to the operative components. For example, the waste engaging components may be hosed off or soaked in a tub of water. The rake drive housing 114 may also be cleaned; however, more controlled surface cleaning is desirable to protect the operative components.

Figure 3:
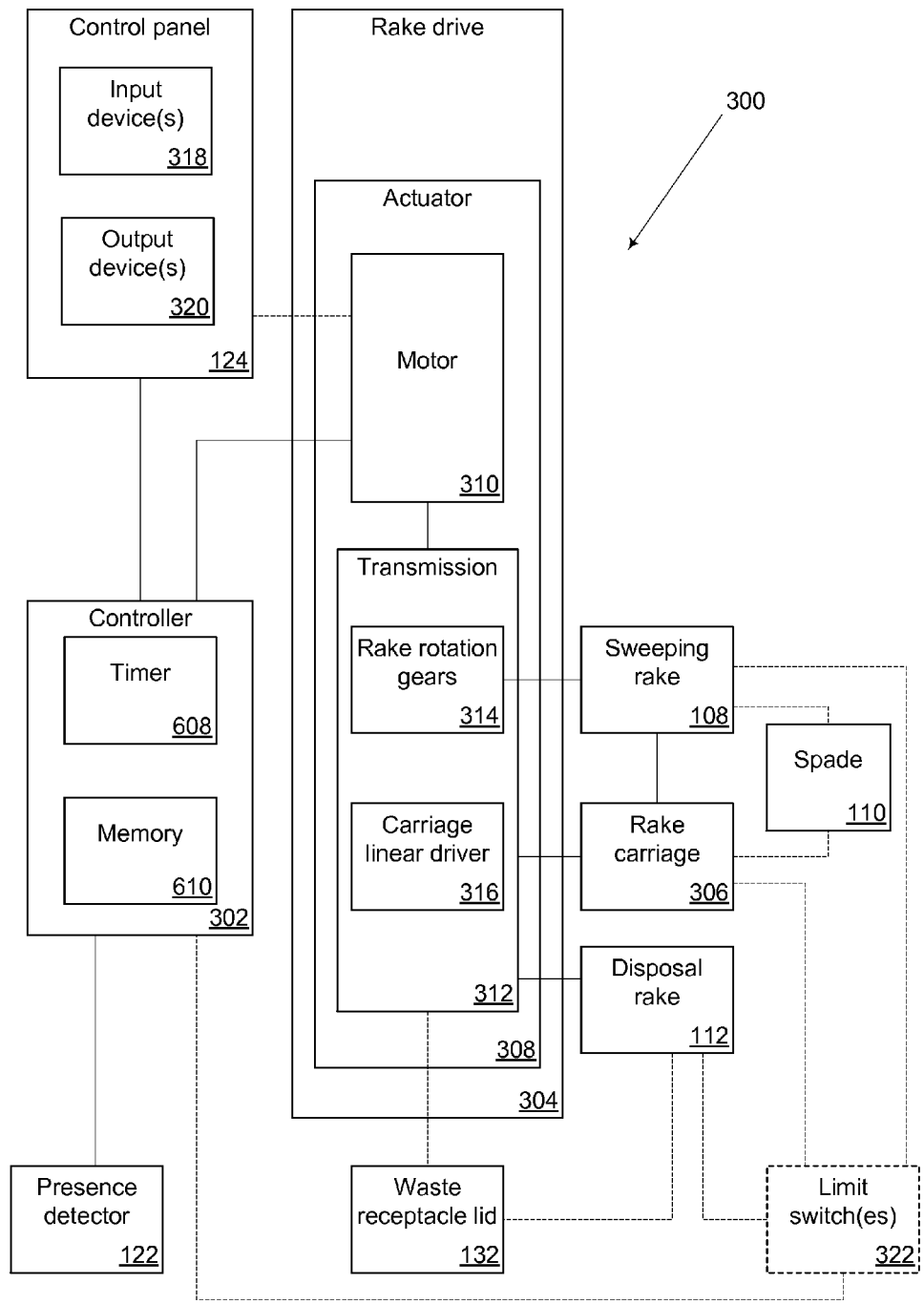
FIG. 3 is a block diagram of one embodiment of the rake control drive system.

FIG. 3 is a block diagram of one embodiment of the rake drive control system 300. The rake drive control system includes a controller 302, a rake drive 304, the presence detector 122, and the control panel 124. The controller 302 receives inputs and feedback and controls the operation of the operative components. In general, the controller 302 includes one or more processors, timers, memories, inputs, and outputs. The controller 302 optionally includes one or more communication interfaces, specialized inputs (e.g., an analog to digital converter, interrupt lines), and specialized outputs (e.g., a digital to analog converter). In addition, the controller 302 optionally includes signal conditioning circuitry to condition, buffer, filter, and/or otherwise process signals for compatibility by the controller 302. The controller 302 is implemented as a multi-component circuit (analog or digital) or a single integrated component (e.g., a microcontroller 302).

The presence detector 122 generally detects the presence of an object (i.e., an animal or cat) in the self-cleaning litter box 100 or the depositing of waste in the self-cleaning litter box 100 and produces a presence signal. Examples of suitable presence detectors include, but are not limited to, optical sensors (e.g., photocells, passive infrared), pressure sensors (e.g., touch switches), acoustic sensors (e.g., microphones), vibration sensors (e.g., accelerometers), and thermal sensors (e.g., infrared thermometers), and moisture sensors.

The presence detector 122 is in communication with the controller 302. When the output of the presence detector 122 indicates an object (i.e., an animal) has entered the litter tray 102, the controller 302 initiates the cleaning cycle. The cleaning cycle begins with a delay period. The delay period is an amount of time that passes before the controller 302 initiates further activity. The delay period is measured from the time that the animal enters the self-cleaning litter box 100 and is intended to provide the animal with sufficient time to use the litter box and leave the area before automatic cleaning begins. In some embodiments, the length of the delay period is preset. In some embodiments, the length of the delay period is adjustable by the user. In some embodiments, the length of the delay period has a constant value. In other embodiments, the length of the delay period is adjustable within a range. In some embodiments, the length of the delay period is a random value within the range. In some embodiments, the range includes a minimum value which determines the smallest amount of time for the delay period. In some embodiments, the range includes both minimum and maximum values.

In addition to triggering the cleaning cycle, the presence detector 122 is also used to prevent or postpone the cleaning cycle if an object is in the litter tray 102 when the cleaning cycle is supposed to start. In various embodiments, the controller 302 checks the output of the presence detector 122 to verify that the litter tray 102 is empty at the end of the delay period. If an animal is present, the controller 302 waits an additional amount of time and rechecks the output of the presence detector 122 before proceeding. In some embodiments, the delay period is restarted if the presence detector 122 detects an animal in the litter tray 102 during the delay period. If the output of the presence detector 122 indicates the litter tray 102 is empty at the end of the delay period, the controller 302 produces a rake drive activation signal to activate the rake drive.

The rake drive includes an actuator 308 and the rake carriage 306. The actuator 308 includes a motor 310 and a linkage/transmission 312, and/or other power transfer device that operatively connects the motor 310 to the rake carriage 306, the sweeping rake 108, and/or the disposal rake 112. The rake carriage 306 provides a point of attachment for and carrier for the sweeping rake 108. The actuator 308 moves the rake carriage 306 in a linear fashion from the home position drive toward the disposal position. In various embodiments, the transmission includes one or more rake rotation gears 314 and a rake carriage linear driver 316. Examples of suitable rake carriage linear drivers include, but are not limited, a worm carried in each rake drive housing side rails and a worm gear associated with and operatively connected to the corresponding worm that moves a corresponding carrier.

During operation, the linear motion of the rake carriage 306 carries the tines of the sweeping rake 108 through the litter. As the sweeping rake 108 travels from the home position to the disposal position, the tines comb through the litter in the litter tray 102 and push waste products toward the waste storage area 106. At the disposal position, the transmission 312 disengages from the rake carriage 306 and engages the sweeping rake 108 and/or the disposal rake 112. The transmission 312 includes one or more rake rotation gears in operative communication with the structural member serving as the rotation axis of the sweeping rake 108 and/or the structural member serving as the rotation axis of the disposal rake 112. When the transmission 312 and the rake rotation gear system(s) are operatively engaged, the sweeping rake 108 and/or the disposal rake 112 rotate to move the waste to the waste storage area 106.

The sweeping rake 108 rotates in the direction of the disposal rake 112 and vice versa. In other words, the sweeping rake 108 and the disposal rake 112 rotate in opposite directions. The tines of the disposal rake 112 are laterally offset from the tines of the sweeping rake 108 tines such that the tines of each rake pass through the spaces between the tines in the other rake. The opposite rotations allow the sweeping rake 108 and the disposal rake 112 to cooperatively lift the waste products out of the unclumped litter. In various embodiments, the sweeping rake 108 rotates upwardly to a substantially horizontal position. The disposal rake 112 continues rotating past the substantially horizontal position and dumps the waste products into the waste storage area 106. In various embodiments, the end wall of the litter area is inclined or curved to compliment the rotational path of the ends of the sweeping rake 108 tines. The complimentary shape of the end wall provides a backstop to prevent the waste products from falling off of the sweeping rake 108 during rotation.

In the illustrated embodiment, the rake drive control system 300 includes optional limit switches 322 in communication with the controller 302. The optional limit switches are positioned along the rake drive path and are used to indicate when the sweeping rake 108 has reached a movement limit. Examples of movement limits include, but are not limited to, the sweeping rake 108 reaching a selected location (e.g., the home position or the disposal position) and the sweeping rake and/or the disposal rake 112 reaching a selected orientation during rotation. Alternatively, the position and orientation of the sweeping rake and/or the disposal rake 112 are monitored and/or controlled using a motor with integrated position control (e.g., a stepper motor) or a motor coupled with a rotation counter or similar device.

The control panel 124 allows the user to adjust the settings and/or control the operation of the self-cleaning litter box 100. In various embodiments, the control panel 124 includes one or more input devices 318 including, but not limited to, buttons, switches, dials, touch screens, and keyboards. In some embodiments, the control panel 124 includes one or more output devices 320 including, but not limited to, audio transducers (e.g., speakers and piezoelectric speakers) and visual indicators (e.g., light emitting diodes, liquid crystal displays, and display screens). In various embodiments, the input devices 318 and the output devices 320 are covered or sealed to minimize the risk of contamination by fluids, solid waste, litter, litter dust, and other contaminants associated with a litter box. The various functions of the self-cleaning litter box 100 controlled via the control panel 124 include, but are not limited to, turning the self-cleaning litter box 100 off and on, manually initiating the cleaning cycle, scheduling times when the cleaning cycle in unavailable (e.g., a night mode), and adjusting the amount of time that elapses before a cleaning cycle starts.

Figure 4:
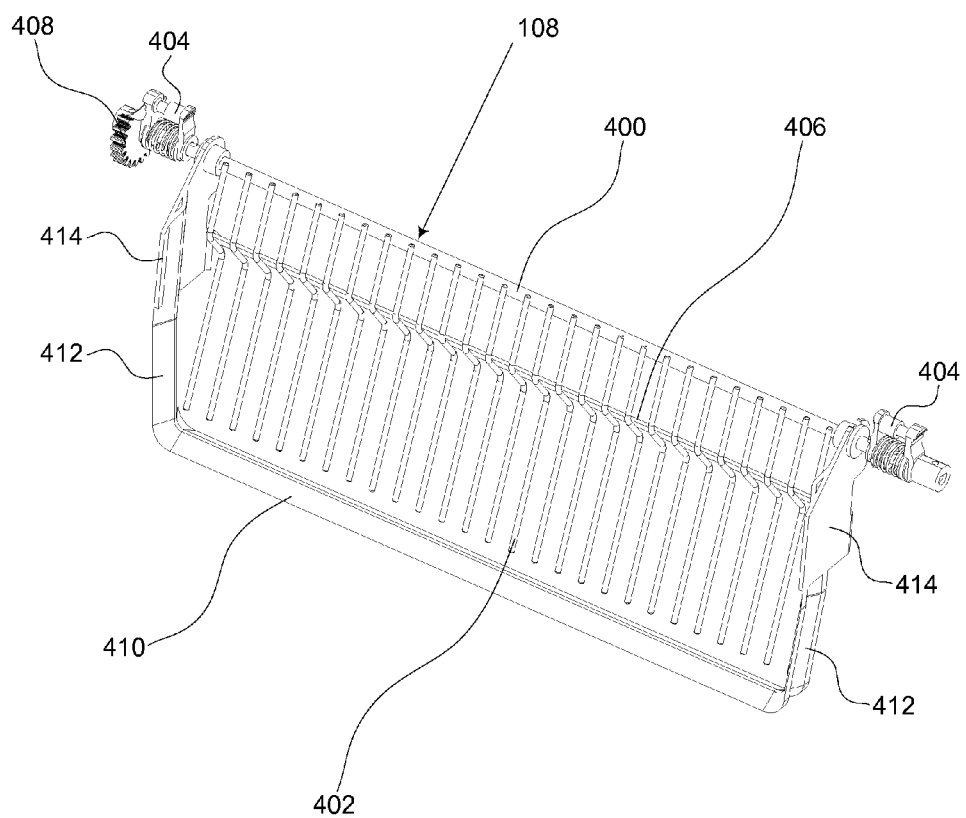
FIG. 4 is a perspective view of one embodiment of the sweeping rake and the spade.
Figure 5:
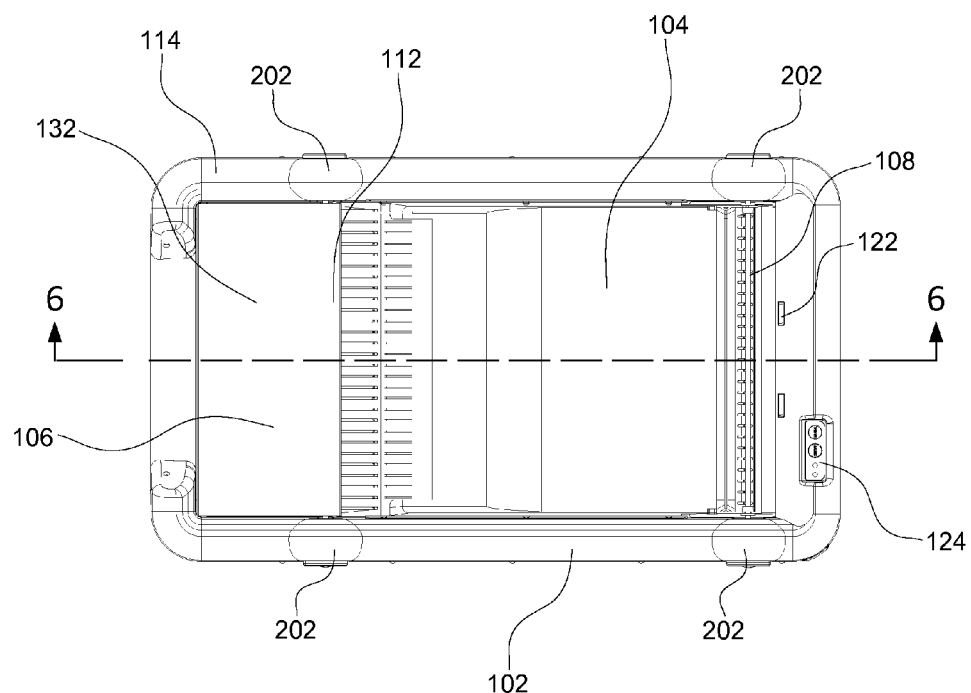
FIG. 5 is a top plan view of one embodiment of the self-cleaning litter box.
Figure 6:
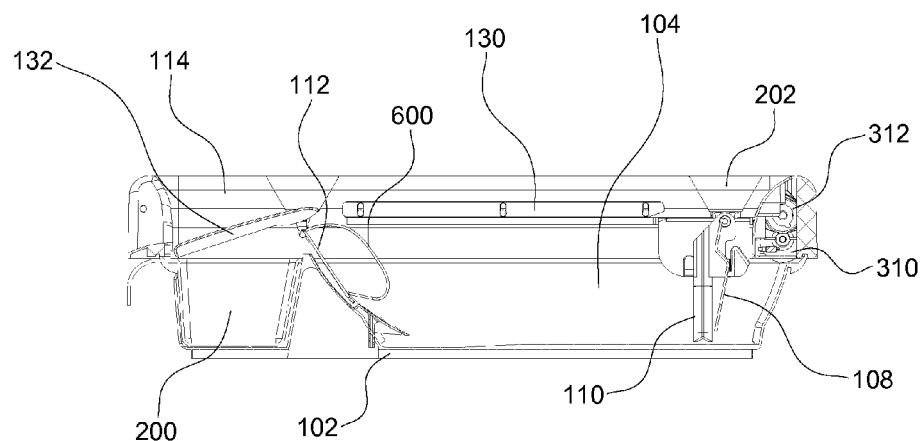
FIG. 6 is a sectional side elevation view of one embodiment of the self-cleaning litter box taken along line 6-6 in FIG. 5.
Figure 7:
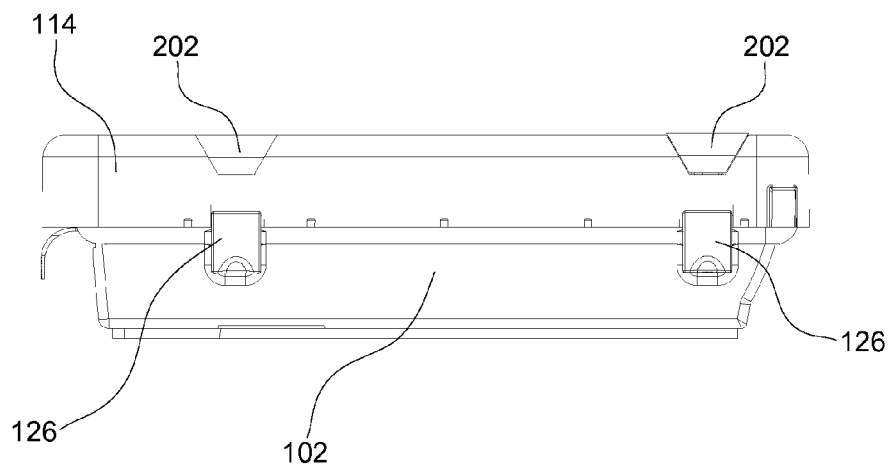
FIG. 7 is a front elevation view of one embodiment of the self-cleaning litter box.
Figure 8:
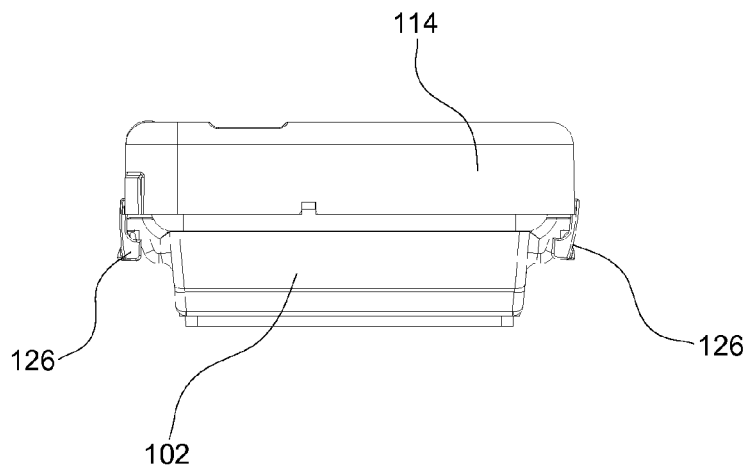
FIG. 8 is a side elevation view of one embodiment of the self-cleaning litter box.

FIG. 4 illustrates one embodiment of the sweeping rake 108 and spade 110 in greater detail. The sweeping rake 108 includes a bow 400 and a multiple tines 402 extending from the bow. The bow 400 provides support and serves as a rotation axis for the sweeping rake 108. Each end of the bow includes a fastener 404 that is configured to cooperate with a corresponding fastener on the rake carriage. The fasteners 404 allow the sweeping rake 108 and the disposal rake 112 to be selected secured to and detached from the rake drive. In the illustrated embodiment, the fasteners are spring clips. The fasteners allow the sweeping rake 108 to be selectively attached to and detached from the rake carriage. The tines 402 are spaced apart with sufficient distance to catch waste products while allowing individual pieces of litter to pass through the sweeping rake 108. The tines 402 point toward the litter tray 102 floor while the sweeping rake 108 is in the home position and moving from the home position to the disposal position. In some embodiments, the tines point toward the litter tray 102 floor while the sweeping rake 108 returns from the disposal position to the home position. In various embodiments, a reinforcement member 406, which runs parallel to the bow 400, attaches to and provides additional support for the tines 402. In various embodiments, at least one rake gear 408 is located at one end of the bow. The rake gear operatively engages the rake drive when the sweeping rake is at or near the disposal position. As it rotates, the sweeping rake assists with transferring the collected waste products to the waste storage area 106. The sweeping rake is generally paired with a spade 110. Structurally, the disposal rake 112 is substantially similar in design to the sweeping rake 108 but is not paired with a spade 110.

The spade 110 includes a floor blade 410 that runs parallel to the bow. A side member extends upwardly from each end of the floor blade 410. The side members are generally angled at the same angle as the side walls of the litter tray 102. The floor blade 410 is bar used to dislodge waste products from the floor of the litter area. The side member includes a side blade 412, a side support 414, or a combination of the side blade 412 and side support 414. The side blade 412 is structurally similar to the floor blade 410 and is used to dislodge waste products from the side walls of the litter tray 102. The side supports 414 are simply extensions that carry the floor blade 410 and, when used, the side blades 412, without any particular features making them especially suited for dislodge waste products. In some embodiments, the side members of the spade 110 are connected to and carried by the bow of the sweeping rake. In other embodiments, the side members of the spade 110 are connected to and carried by the rake carriage separate from the sweeping rake.

The spade 110 is sized and positioned to travel close to the floor and side walls of the litter tray 102 leaving a small amount of clearance so the spade 110 does not drag against the litter tray 102 and add unnecessary load to the rake drive. The amount of clearance is selected so that most waste products stuck to the floor will have a thickness that exceeds the clearance height. In various embodiments, the forward leading edge of the floor blade 410 is angled down toward the floor to help direct the blade downward the "dig" under any stuck waste products as the floor blade 410 moves toward the disposal position. In some embodiments, the reverse leading edge of the floor blade 410 is angled down toward the floor to help direct the blade downward the "dig" under any stuck waste products as the floor blade 410 returns to the home position. When both the forward leading edge and the reverse leading edge are downwardly angled, the floor blade 410 has an inverted "V" shaped cross-section. The angled cross-section also helps lift the dislodged waste products up into the reach of the tines of the sweeping rake.

In various embodiments of the waste receptacle 200 including the waste receptacle cover 132 (i.e., lid), the waste receptacle cover 132 is pivotally connected to the rake drive housing 114. In other embodiments, the waste receptacle cover 132 is pivotally connected to the waste receptacle 200. In other embodiments, the waste receptacle cover 132 is pivotally connected to the litter tray 102. In various embodiments, the disposal rake 112 includes a lifting arm 600 that engages the waste receptacle cover. The lifting arm is shaped to remain in engagement with the waste receptacle cover as the disposal rake rotates toward the waste receptacle. Examples of suitable shapes for the lifting arm include, but are not limited to, a loop or other curve.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A self-cleaning litter box comprising:
    a litter tray for holding litter, said litter tray comprising a floor and a plurality of walls;
    a rake drive housing resting upon and selectively mechanically secured to said litter tray, said rake drive housing having a first end rail, a second end rail, and two sides rails connecting said first end rail and said second end rail;
    a rake carriage carried by said rake drive housing;
    an actuator carried by said rake drive housing, said actuator operatively connected to said rake carriage to move said rake carriage from a home position proximate to said first end rail toward a disposal position proximate to said second end rail and back to said home position in response to a rake drive activation signal;
a sweeping rake carried by said rake carriage, said sweeping rake comprising a plurality of tines having a raking position in which said plurality of tines have terminal ends pointing towards said litter tray floor while said rake carriage moves between said home position and said disposal position; and
a spade carried by said rake carriage, said spade comprising a floor blade substantially parallel to and above said floor of said litter tray and below said terminal ends of said plurality of tines thereby defining a space between said spade and said terminal ends of said plurality of tines, wherein said rake carriage carries said spade between said home position and said disposal position.

2. The self-cleaning litter box of claim 1 further comprising:
a waste receptacle engaging said litter tray proximate to said disposal position;
a waste receptacle cover extending between said side rails, said waste receptacle cover covering said waste receptacle when in a closed position.

3. The self-cleaning litter box of claim 2 further comprising
a disposal rake carried by said rake drive housing proximate to said waste receptacle and operably attached to said actuator, said disposal rake having a plurality of tines laterally offset from said plurality of tines of said sweeping rake;
said sweeping rake rotating upwardly to a substantially horizontal orientation;
said disposal rake rotating toward said waste receptacle, said disposal rake carrying waste and clumped litter and depositing the waste and clumped litter into said waste receptacle.

4. The self-cleaning litter box of claim 3 characterized in that said disposal rake further comprises a lifting arm that engages the waste receptacle cover.

5. The self-cleaning litter box of claim 1 wherein said spade extends between said side rails at a position with a selected clearance from the side walls.

6. The self-cleaning litter box of claim 5 characterized in that said spade is selectively attachable to and removable from said rake carriage.

7. The self-cleaning litter box of claim 1 characterized in that said actuator comprises a motor and a transmission, said transmission operatively connecting said motor to said rake carriage.

8. The self-cleaning litter box of claim 7 characterized in that:
said transmission comprises a first worm carried by one said side rail and a second worm carried by the other said side rail; and
said rake carriage comprises a first carrier operatively connected to a worm gear, said first carrier carried by and operatively engaging said first worm and a second carrier carried by and operatively engaging said second worm.

9. The self-cleaning litter box of claim 7 characterized in that said sweeping rake further comprises a fastener part at each end releasably engaging a cooperating fastener part allowing said sweeping rake to be secured to and detached from said rake carriage.

10. The self-cleaning litter box of claim 1 characterized in that said sweeping rake comprises a bow, said plurality of tines projecting from said bow toward said litter tray floor.

11. The self-cleaning litter box of claim 1 further comprising:
a presence detector generating an output indicating whether or not an object is in said litter tray;
a controller in communication with said actuator and said presence detector, said controller generating said rake drive activation signal after a delay measured from receipt of said presence detector output.

12. The self-cleaning litter box of claim 1 wherein said spade is selectively attachable to and removable from said rake carriage.

13. A self-cleaning litter box comprising:
a litter tray for holding clean litter, said litter tray comprising a bottom and a plurality of walls;
a rake drive housing having a first end rail, a second end rail, and two side rails connecting said first end rail and said second end rail;
a fastener comprising a first part attached to said litter tray and a second part attached to said rake drive housing, said first part selectively attachable to and detachable from said second part to secure said rake drive housing to and release said rake drive housing from said litter tray;
a rake carriage disposed within said rake drive housing;
an actuator carried by said rake drive housing, said actuator operatively connected to said rake carriage to move said rake carriage from a home position proximate to said first end toward said second end to a disposal position and back to said home position;
a sweeping rake carried by said rake carriage, said sweeping rake comprising a plurality of tines having a raking position in which said plurality of tines have terminal ends pointing towards said litter tray bottom while said rake carriage moves between said home position and said disposal position; and
a spade carried by said rake carriage, said spade comprising a floor blade substantially parallel to and above said floor of said litter tray and below said terminal ends of said plurality of tines thereby defining a space between said spade and said terminal ends of said plurality of tines, wherein said rake carriage carries said spade between said home position and said disposal position.

14. The self-cleaning litter box of claim 13 wherein said spade is selectively attachable to and removable from said rake carriage.

15. A self-cleaning litter box comprising:
a litter tray for holding clean litter, said litter tray comprising a bottom and a plurality of walls;
a rake drive housing resting upon and selectively mechanically secured to said litter tray, said rake drive housing having a first end rail, a second end rail, and two sides rails connecting said first end rail and said second end rail, each side rail defining an opening;
a rake carriage disposed within said rake drive housing accessible through said openings;
an actuator carried by said rake drive housing, said actuator operatively connected to said rake carriage to move said rake carriage from a home position proximate to said first end rail toward a disposal position proximate to said second end and back to said home position;
a sweeping rake carried by said rake carriage, said sweeping rake comprising a plurality of tines having a raking position in which said plurality of tines have terminal ends pointing towards said litter tray bottom while said rake carriage moves between said home position and said disposal position;
a spade carried by said rake carriage, said spade comprising a floor blade substantially parallel to and above said floor of said litter tray and below said terminal ends of said plurality of tines thereby defining a space between said spade and said terminal ends of said plurality of tines, wherein said rake carriage carries said spade between said home position and said disposal position; and a barrier covering each said opening, said barrier allowing unrestricted movement of said rake carriage and said sweeping rake while minimizing passage of litter and fluids into said rake drive housing.

16. The self-cleaning litter box of claim 15 further comprising a second rake operatively connected to said rake drive housing, said second rake having a plurality of tines laterally offset from said plurality of tines of said first rake allowing the tines of each rake to pass through the spaces between the tines in the other rake, said first rake and said second rake rotating in opposite directions to cooperatively separate the waste products from unclumped litter for disposal.

17. The self-cleaning litter box of claim 15 wherein said spade extends between said side rails at a position with a selected clearance from the side walls.

18. The self-cleaning litter box of claim 15 wherein said spade is selectively attachable to and removable from said rake carriage.

\* \* \* \* \*